(12) United States Patent
Montagnino et al.

(10) Patent No.: US 6,608,260 B2
(45) Date of Patent: Aug. 19, 2003

(54) PLANETARY WEIGH SCALE

(75) Inventors: James G. Montagnino, St. Charles, IL (US); Janice M. Biang, Evergreen Park, IL (US)

(73) Assignee: Sunbeam Products, Inc., Boca Raton, FL (US)

( * ) Notice: Subject to any disclaimer, the term of this patent is extended or adjusted under 35 U.S.C. 154(b) by 100 days.

(21) Appl. No.: 09/960,751

(22) Filed: Sep. 21, 2001

(65) Prior Publication Data

US 2003/0056994 A1 Mar. 27, 2003

(51) Int. Cl.$^7$ .......................... G01G 23/30; G01G 23/01
(52) U.S. Cl. .................. 177/25.11; 177/25.13; 177/177; 177/DIG. 2; 702/101
(58) Field of Search ............... 177/25.11, 25.12, 177/25.13, 25.14, 177, 178, 210 FP, DIG. 2, DIG. 3, DIG. 6; 702/101, 173

(56) References Cited

U.S. PATENT DOCUMENTS

| | | | |
|---|---|---|---|
| 2,913,238 A | 11/1959 | Tommervik | 177/25.11 |
| 3,100,720 A | 8/1963 | Carrol | 177/37 |
| 3,134,451 A | 5/1964 | Hanssen | 177/225 |
| 3,181,633 A * | 5/1965 | Worst | 177/178 |
| 3,797,596 A | 3/1974 | Tanji et al. | 177/210 R |
| 4,072,201 A * | 2/1978 | Wiesler | 177/210 R |
| 4,108,103 A | 8/1978 | Ammar | 116/271 |
| 4,258,812 A * | 3/1981 | Pfeiffer | 177/210 R |
| 4,542,799 A | 9/1985 | Komoto | 177/177 |
| 5,056,050 A * | 10/1991 | Fuchs et al. | 702/101 |
| 5,133,420 A | 7/1992 | Smith | 177/256 |
| 5,141,065 A * | 8/1992 | Maxwell et al. | 177/210 R |
| 6,410,863 B1 * | 6/2002 | Cappiello | 177/25.13 |

OTHER PUBLICATIONS

U.S. Patent Application Publication #US 2002/0195283 A1, Petrucelli, Dec. 26, 2002.*

* cited by examiner

*Primary Examiner*—Randy Gibson
(74) *Attorney, Agent, or Firm*—Lawrence J. Shurupoff (57) ABSTRACT

A body weigh scale that displays a user's weight in a gravity system other than where the scale is being used, such as a planet, the sun, the moon, or another celestial body. The body weigh scale includes a conversion component that converts the user's weight to the other gravity system. In one embodiment, the scale utilizes a mechanical weighing mechanism, having an analog display, and also has a digital display, where weight information is generated, for example, by a pulse counter. The user's weight may be simultaneously displayed both in the "home" gravity system where the scale is used (e.g., the earth), and another, "away" gravity system (e.g., the sun). The display of the home weight may be via an analog dial, and the display of the away weight may be via a digital display such as an LCD.

32 Claims, 6 Drawing Sheets

PLANETARY WEIGH SCALE

FIELD OF THE INVENTION

The present invention relates to weigh scales, and more particularly to body weigh scales.

BACKGROUND OF THE INVENTION

Scales are devices that are used to determine the weight of an object by measuring the gravitational pull exerted on that object. Scales are commonly used to determine the physical amount or quantity of an item, such as a foodstuff, for example.

Body weigh scales can be found in many contemporary homes, usually in a bathroom. For this reason, the body weigh scales are often called "bathroom scales." In general, body weigh scales include a platform onto which a user steps, and the user's weight is then displayed. Body weigh scales allow a user to monitor his or her weight, usually before or after a shower, or just after waking up in the morning.

Many body weigh scales are mechanical, spring scales. In a spring scale, a platform is connected to a spring, which either stretches or compresses to balance a load (i.e., a person) placed on the platform. A needle, whose position depends on the extent to which the spring is stretched or compressed, indicates the weight of the load. Some mechanical scales include a pulse counter and a digital display upon which the user's weight is shown.

Electronic body weigh scales utilize electricity to measure loads. Electronic scales are faster, and generally more accurate, than their mechanical counterparts. A common type of electronic scale uses a strain-gauge load cell. This type of scale has a platform supported by a column, with a strain gauge fused to the column. A strain gauge is a thin wire whose electrical resistance changes when the wire is stretched or compressed. When a load is placed on the platform, the column and strain gauge are compressed. The corresponding change in resistance of the strain gauge can be used to determine the person's weight.

SUMMARY OF THE INVENTION

The present invention is directed to a body weigh scale that displays a user's weight in a gravity system other than where the scale is being used, such as a planet, the sun, the moon, or another celestial body. To this end, the body weigh scale includes a conversion component that converts the user's weight to the other gravity system. For example, for a body weigh scale that is used on earth, the conversion component may convert the user's weight on earth to the user's weight on the moon, the sun, or any of the nine planets.

The body weigh scale may use one of many different weighing mechanisms, including mechanical or electrical weighing mechanisms. In one embodiment, the scale uses a mechanical weighing mechanism, having an analog display, and also has a digital display, for which weight information is generated, for example, by a pulse counter. In accordance with one aspect of the present invention, the user's weight may be simultaneously displayed both in a "home" gravity system where the scale is used (e.g., the earth), and another, "away" gravity system (e.g., the sun). In one embodiment, the display of the home weight is via an analog dial, and the display of the away weight is via a digital display such as an LCD. However, the displays may be reversed (i.e., a digital display for the home weight, and an analog display for the away weight), or both weights may be displayed by either analog or digital displays.

A selector may be provided so that a user may pick one of many away gravitational system. The selector may, for example, be a momentary switch that indexes through the nine planets, the sun, and the moon, or may be a dial that allows selection of one of the celestial bodies. Also, if desired, the user's weight may be displayed in multiple away gravity systems, either on one large display, or on several displays.

Other advantages will become apparent from the following detailed description when taken in conjunction with the drawings, in which:

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention. In addition, to the extent that orientations of the invention are described, such as "top," "bottom," "front," "bottom," and the like, the orientations are to aid the reader in understanding the invention, and are not meant to be limiting.

Figure 1:
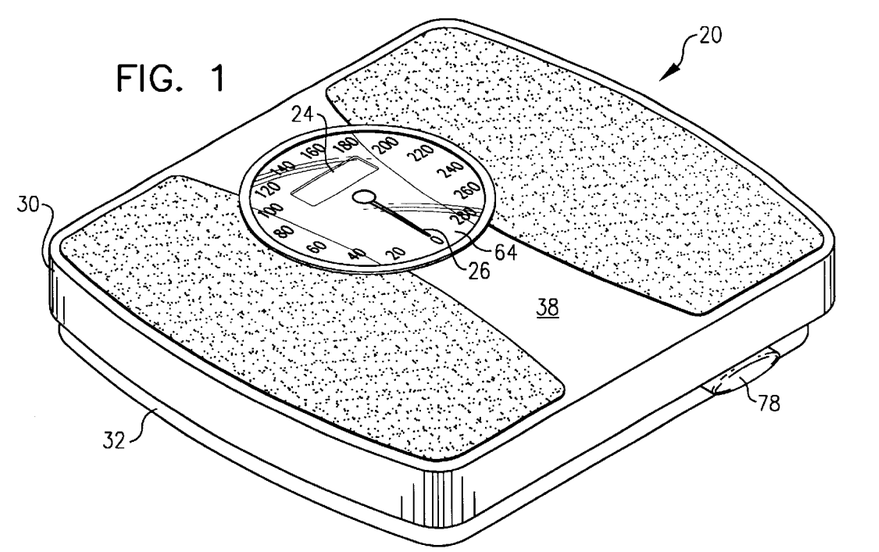
FIG. 1 is a perspective view of a body weigh scale incorporating the present invention.

Referring to FIG. 1 of the drawings, there is shown a body weigh scale designated generally by reference numeral 20. Generally described, the body weigh scale 20 includes a conversion component 22 (FIG. 5) that converts a user's weight to a gravity system other than the gravity system where the scale is located. The body weigh scale 20 may then display the user's weight in the other gravity system, for example on a digital display 24. If desired, the user's weight may also be displayed for the gravity system in which the scale is located, e.g., via an analog display, such as a needle 26 that travels around an indicia-bearing dial 28.

For ease of description, as used herein, the terms "home" or "home system" are used to represent the gravity system in which the body weigh scale 20 is located and used. The home gravity system may be, for example, the earth at sea level (i.e., atmospheric pressure). Also for ease of description, the gravity system to which the user's weight is converted, and in which the scale is not located, is referred to herein as the "away" gravity system, or the "away system." The away gravity system may be, for example, the sun, the moon, the nine planets, another celestial body, underwater, on top of a mountain, or other gravity systems.

For description purposes only, the body weigh scale 20 shown in the drawings is described as utilizing a particular mechanical weighing mechanism. However, the features of the present invention may be used in many scale configurations having several different types of weighing mechanisms, including but not limited to pulse count and electronic weighing mechanisms. The weighing mechanism described, in fact, utilizes a pulse counter to generate information for a the digital display 24, as described below. The user's weight in the away system may be displayed on a digital display such as the digital display 24. In addition, if desired, an additional digital display may be used to display the user's weight in the home system or in another away system. This display may be either digital or analog. If both the away weight and the home weight are shown by digital displays, the display of the information may be on one digital display, or on more than one. Also, if desired, an analog display may be used to display a user's weight in an away gravity system.

Figure 2:
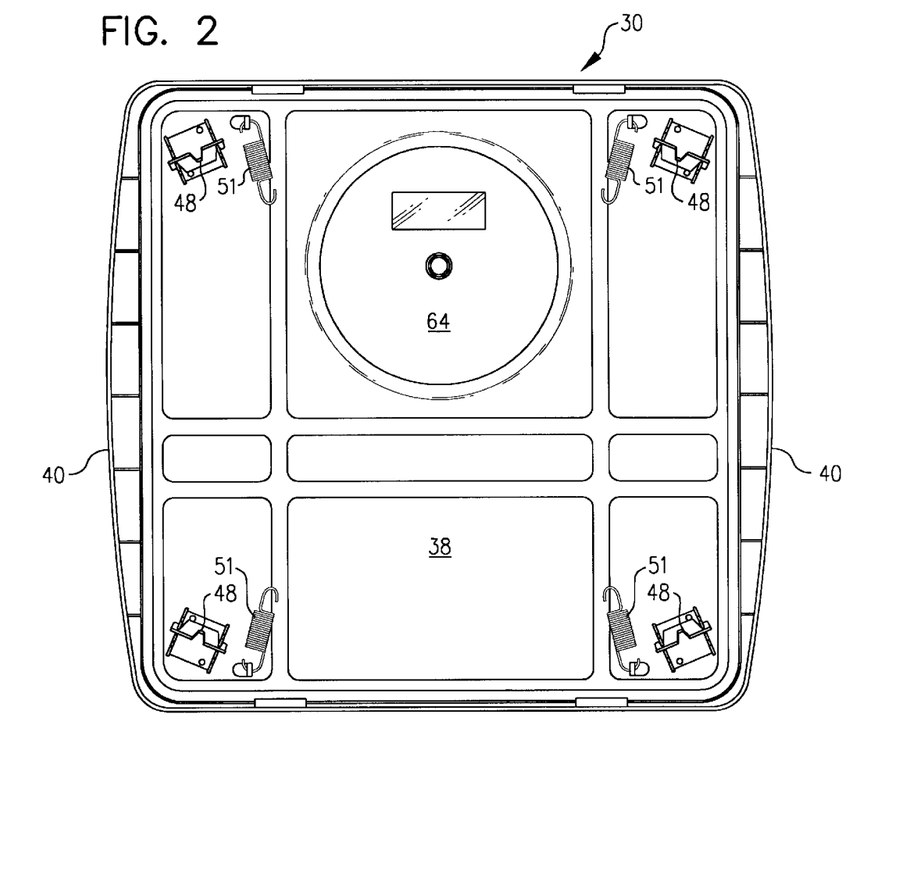
FIG. 2 is a bottom view of a platform of the body weigh scale of FIG. 1, showing the platform removed from a base for the body weigh scale.

The body weigh scale 20 shown in the drawings includes a load support platform 30 and a base 32. The load support platform 30 is shown removed from the base 32 in FIG. 2, and the base is shown removed from the load support platform in FIG. 3. The base 32 includes a substantially flat horizontal bottom 34 and an upstanding peripheral wall 36. The load support platform 30 includes a flat top portion 38 (the top of which is shown in FIG. 1, and the bottom of which is shown in FIG. 2), and a peripherally and downwardly extending flange 40. When assembled, as shown in FIG. 1, the load support platform 30 fits over the base 32, with the peripheral flange 40 extending downwardly and overlapping the upwardly extending peripheral wall 36 on the base 32.

The load support platform 30 and the base 32 form an enclosure within which force collection levers 44, 46 (FIG. 3) and a weighing mechanism 50 are located. The force collection levers 44, 46 include two primary levers 44 and two secondary levers 46. All four of the levers 44, 46 are pivotally attached at their distal ends to the corners and the upper edges of the upwardly extending peripheral wall 36. The secondary levers 46 are attached at their opposite ends, for example by loops 47, to the middle of the primary levers. In this manner, pivotal movement of the secondary levers 46 causes a corresponding pivotal movement of the primary levers 44. The load support platform 30 includes four feet 48 that fit in notches 49 on the primary and secondary levers 44, 46. In this manner, force downward on the load support platform 30 is transferred directly to the ends of the primary levers 44. The load support platform 30 is attached to the base 32 for movement relative thereto, for example by springs 51, such as is known in the art.

Referring to the weighing mechanism 50, it forms no part of the present invention and may include a mechanical mechanism utilizing a spring as disclosed in the drawings for (e.g., FIGS. 5, 6 and 7), and described in detail in, U.S. Pat. No. 3,134,451 to Hanssen, assigned to the same assignee as the present invention. Alternatively, as described above, the weighing mechanism can be of the electronic strain gauge or pulse count variety as are well known in the domestic scale art.

Although the reader may refer to the Hanssen patent for a description of a weighing mechanism, the structure and operation of the mechanical mechanism in that patent is shown in the drawings (FIG. 3) and is described for the reader's convenience. In the disclosed embodiment, the weighing mechanism 50 includes a spring 52 (FIG. 3) which is deformed and displaced by application of force to a plate 54 which is engaged by the ends of the primary force levers 44. Downward force on the primary force levers 44 and/or the secondary force levers 46 causes the ends of the primary force levers 44 to press the plate 54 down against the biasing action of the spring 52. The amount of displacement of the plate 54 is proportional to the weight applied to the load support platform 30, which, as explained above, exerts its force to the primary and secondary levers 44, 46. This downward displacement of the plate 54 is translated to horizontal side-to-side movement of a rack 60 via a lever 58. The rack 60 cooperates with a pinion 62 to rotate the needle 26 (attached to the pinion, but not shown in FIG. 3) relative to the indicia-bearing dial 28. The indicia-bearing dial 28 and the needle 26 are visible through a window 64 (FIG. 2) in the load support platform 30.

A disk 68 (FIG. 3) is also attached for rotation with the pinion 62. The disk 68 is preferably a circular encoder disc formed of a conductive material, and includes a plurality of circumferentially-spaced radially-extending tabs 64 defining slots 66 therebetween.

Figure 3:
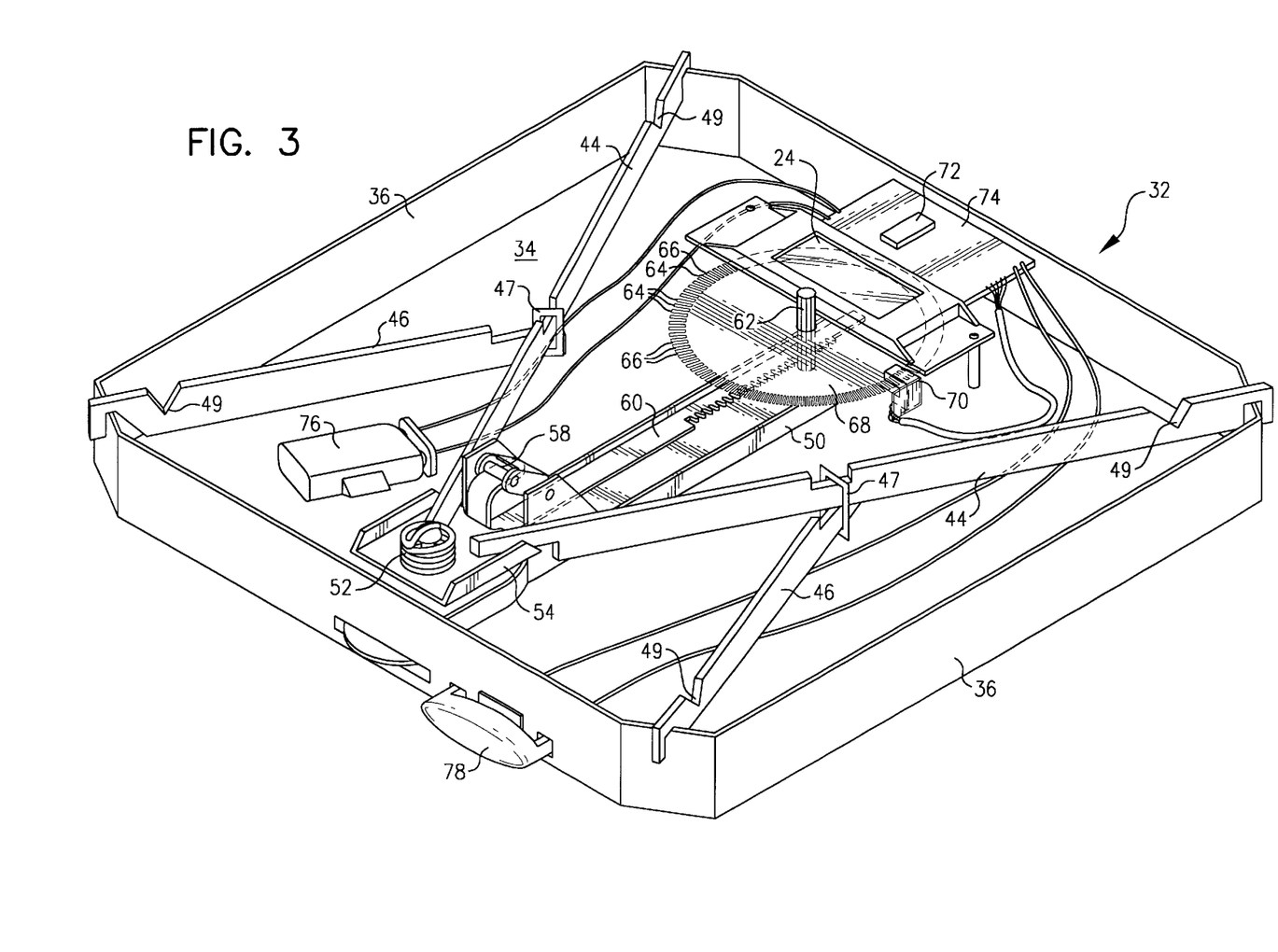
FIG. 3 is an isometric view of the base and a mechanical weighing mechanism for the body weigh scale of FIG. 1, shown with the platform removed from the base.

A pulse counter 70 is mounted so that it surrounds opposite sides of the tabs 64 and slots 66 and so that the disk 68 may rotate therein. As is known in the art, the pulse counter 70 includes an electrical interrupter or similar structure that generates a series of pulses as a result of the tabs 64 and the slots 66 rotating through the pulse counter.

A microcontroller 72 (FIG. 5) is connected to the pulse counter 70 (e.g., via a printed circuit board 74) for receiving pulse signals therefrom. The microcontroller 72 counts pulses received from the pulse counter 70 in a conventional manner and derives a weight measurement, which in turn is provided to the conversion component 22, as described further below.

Figure 5:
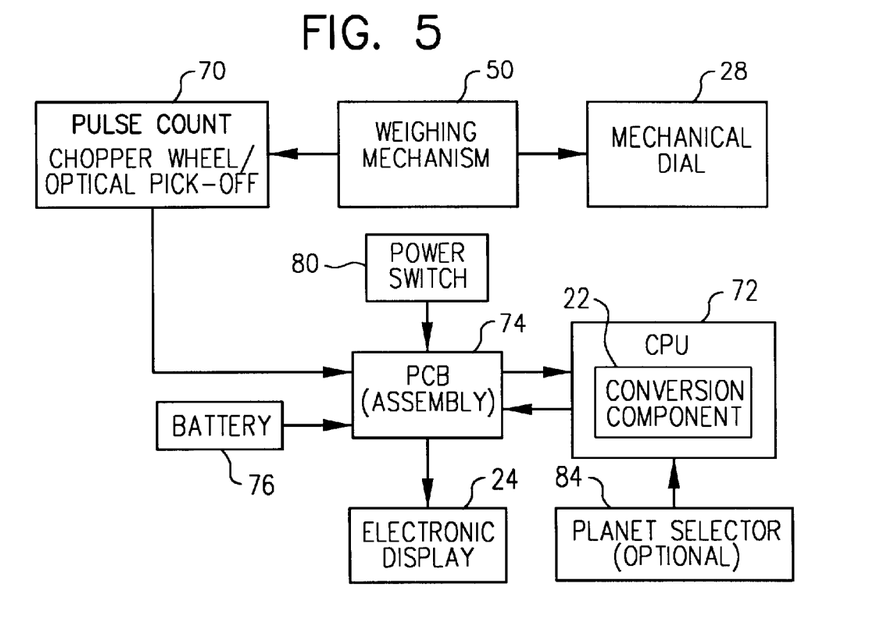
FIG. 5 is a simplified circuit diagram for the body weigh scale of FIG. 1.
Figure 6:
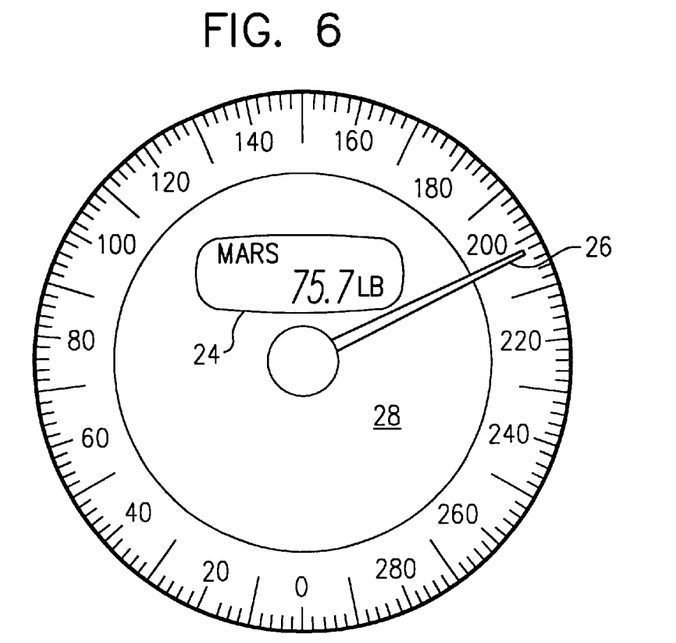
FIG. 6 is a top view of a display that may be used with the body weigh scale of FIG. 1, showing a user's weight on earth on an analog dial, and showing the user's weight on Mars on a digital display.
Figure 7:
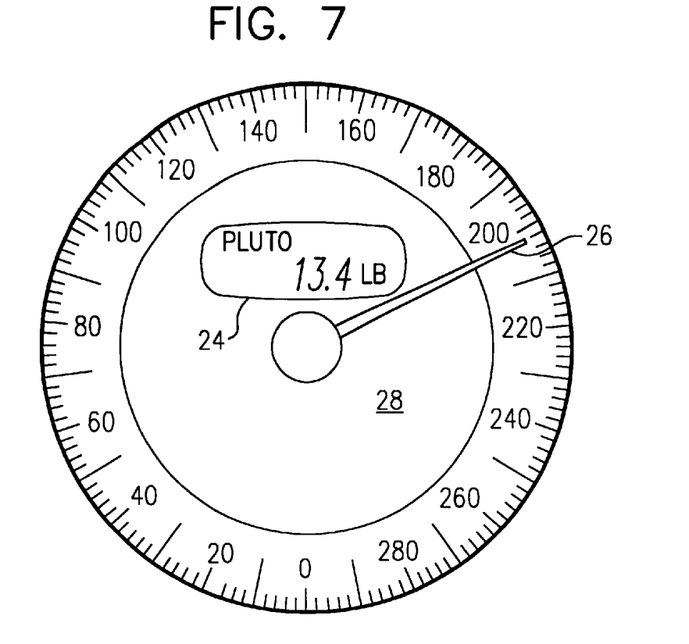
FIG. 7 is a top view of the display of FIG. 6, showing a user's weight on earth on an analog dial, and showing the user's weight on Pluto on a digital display.
Figure 8:
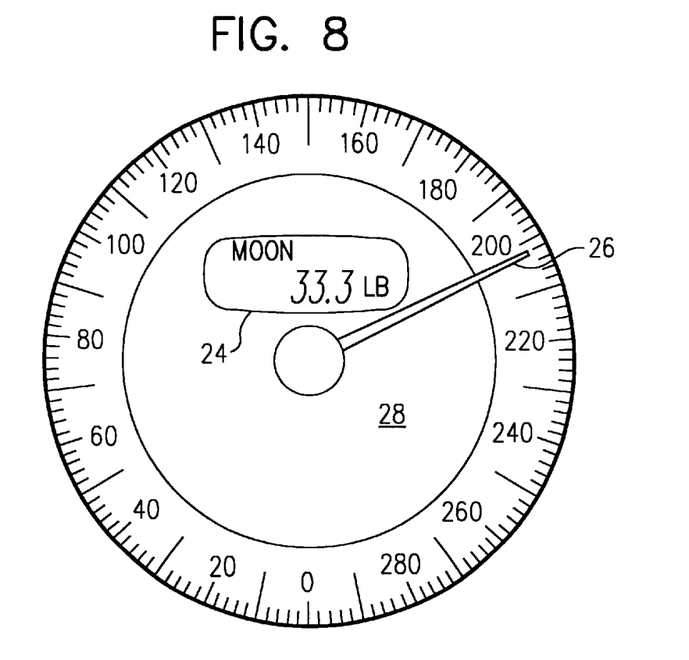
FIG. 8 is a top view of the display of FIG. 6, showing a user's weight on earth on an analog dial, and showing the user's weight on the moon on a digital display.
Figure 9:
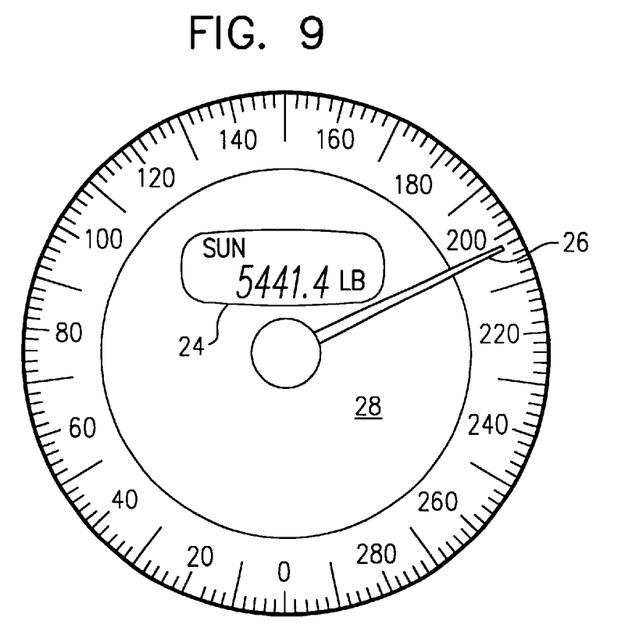
FIG. 9 is a top view of the display of FIG. 6, showing a user's weight on earth on an analog dial, and showing the user's weight on the sun on a digital display.

The circuit for the body weigh scale 20 additionally includes a battery 76 for powering the microcontroller 72 and the printed circuit board 74. The digital display 24 is connected to the printed circuit board 74 as well.

In operation, a user approaches the body weigh scale 20 to be weighed. Depending upon the operation of the body weigh scale 20, the user may need to turn on the microcontroller 72 and the digital display 24, for example by tapping with a foot a button 78 (FIGS. 1 and 3) on the front of the body weigh scale 20 that serves as a power switch 80 (FIG. 5) for the body weigh scale 20. Other mechanisms may be used for the power switch 80, such as a sensor (not shown, but known in the art) that turns on the power to the microcontroller when a user taps the top of the load support platform 30.

The user steps on the load support platform 30, and the feet 48 transfer the user's weight to the primary levers 44 and the secondary levers 46, which in turn transfer the weight to the plate 54. Movement of the plate 54 downward, against the bias of the spring 52, causes the lever 58 to rotate, and the rack 60 to move horizontally in the base 32. The movement of the rack 60 causes the pinion 62 to rotate, which in turn causes the needle 26 to rotate and the indicate the user's weight on the indicia-bearing dial 28. For example, in FIGS. 6–10, the user's weight is displayed as 201 pounds.

The rotation of the pinion 62 also causes the disk 68 to rotate. Rotation of the disk 68 causes a series of pulses to be generated by the pulse counter 70. The pulses are generated as a result of the tabs 64 and the slots 66 moving through the pulse counter 70. Each pulse represents an increment of rotational movement of the disk 68. Two transistors may be used in a manner known in the art to allow sensing of bidirectional rotational movement, to prevent errors. The pulses are forwarded to the microcontroller 72.

Figure 4:
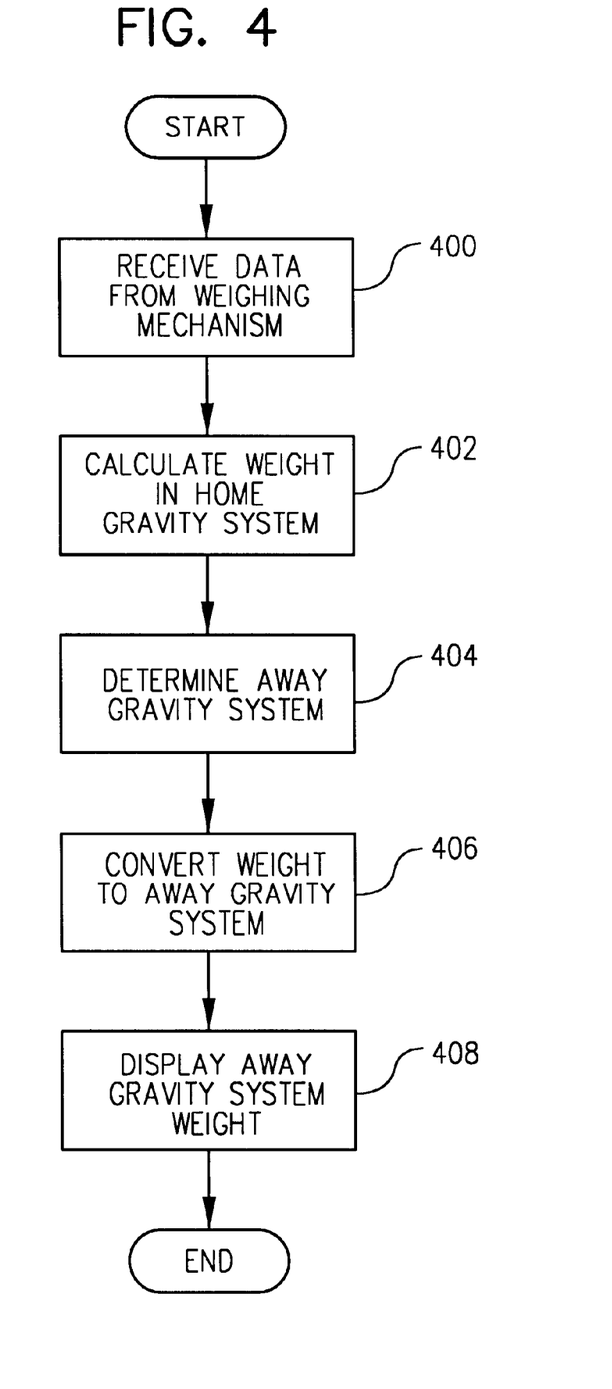
FIG. 4 is a general overview of a process for converting a user's weight in a home gravity system to a weight in an away gravity system in accordance with one aspect of the present invention.

FIG. 4 is a general overview of a process for utilizing the pulse information and generating the user's weight in accordance with one aspect of the present invention. The user's weight may be supplied in other manners by different weighing mechanism, for example a strain gauge, but the process for using the information is similar. Beginning at step 400, the microcontroller 72 receives the weight data information from the weighing mechanism 50, e.g., pulse counts. The microcontroller 72 is configured with suitable counter functions for counting the number of pulses received and generating the user's weight based upon the number of pulses (step 402). Alternatively, if a different type of weighing mechanism is used, the microcontroller 72 generates the weight information accordingly, in a manner known in the art.

At step 404, the microcontroller 72 determines the proper gravity system to which the user's weight should be converted. This may be done in several ways. For example, the microcontroller 72 may include a queue and may sequentially select gravity systems that are contained in a database so that the next away gravity system is displayed when a user steps on the body weigh scale 20. Alternatively, if a power button is used (e.g., the power button 78), the power button may be a momentary switch that indexes one increment each time the user depresses it, through available away gravity systems. The selected away gravity system may be displayed by the digital display 24. As another alternative, a selector dial or switch 84 (FIG. 5) may be provided on the body weigh scale 20 to allow manual selection of a gravity system.

At step 406, the microcontroller 72 converts the user's weight to the selected gravity system. This process may be done, for example, by multiplying the user's weight times a gravity factor. The gravity factor represents the number of weight units for the selected gravity system that one pound on the home gravity system would weigh on the away gravity system. As an example, the following gravity factors may be used to represent the nine planets, the sun, and the moon, when the home gravity system is the earth:

| Planet/Celestial Body | Gravity Factor | Weight Conversion for 201 lbs. |
|---|---|---|
| Mercury | 0.284 | 57.084 |
| Venus | .907 | 182.307 |
| Mars | 0.38 | 76.38 |
| Jupiter | 2.34 | 470.34 |
| Saturn | 0.925 | 185.925 |
| Uranus | 0.795 | 159.795 |
| Neptune | 1.125 | 226.125 |
| Pluto | 0.041 | 8.241 |
| The Moon | 0.166 | 33.366 |
| The Sun | 27.072 | 5441.4 |

Other conversion factors may be used, but the foregoing are representative of at least one set of gravity factors that are believed to represent the difference between the earth's gravity and the other planets. The above chart also shows the results of multiplying the gravity factor times a user's weight of 201 pounds for each of the planets, the moon, and the sun.

At step 408, the microcontroller 72 displays the away gravity system weight, for example with a description of the away gravity system. FIGS. 6–9 show a number of examples of display of the user's weight for several different away gravity systems (Mars, Pluto, the moon, and the sun, respectively). For each of the displays, the user's weight is shown in the home gravity system (here earth) via the needle 26 on the indicia-bearing disk 28. In addition, the away gravity system is shown on the digital display 24, along with a description of the away gravity system (i.e., the name of the away gravity system).

The present invention provides a body weigh scale 20 by which a user may have his weight displayed for another gravitational system. In most instances, it is anticipated that the home gravity system will be earth, and the body weigh scale 20 may display the user's weight for different planets or celestial bodies. If desired, the digital display 24 may be enlarged to display the user's weight in two or more away gravity systems, or to display the user's weight in the home and one or more away gravity systems. Alternatively, more than one digital display 24 may be provided to show the user's weight in multiple (home or away) gravity systems. Also alternatively, instead of a digital display, the away gravity weight may be shown on a mechanical display, such as via the needle 26 and the indicia-bearing disk 28.

Figure 10:
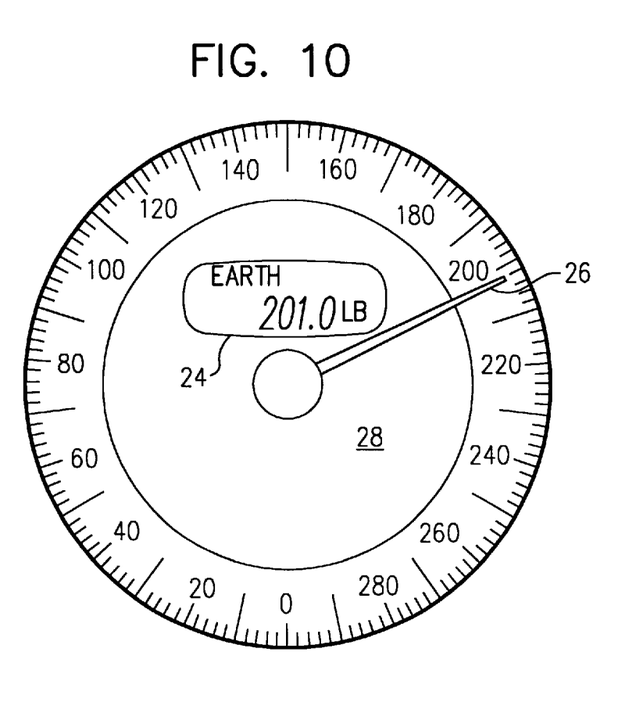
FIG. 10 is a top view of the display of FIG. 6, showing a user's weight on earth on an analog dial, and showing the user's weight on earth on a digital display.

By providing the needle 26 and the indicia-bearing disk 28, the user is provided his or her weight on earth along with the weight in the away gravity system. This feature provides the benefit of the user being able to monitor his or her weight without having to use another scale or convert the away gravity system weight to the home gravity system. As described above, if desired, the home gravity system weight may be displayed on a digital display. This digital display may also include one or more away gravity system weights, or separate displays (analog or digital) may be provided for this purpose. In addition, if desired, the selector dial or switch 84 may be operated to show the user's weight on earth on the digital display 24 (FIG. 10). To do this, the conversion component 22 may, for example, multiply the weight information by one, or the weight information may be used without an operation by the conversion component.

The user's weight may be converted in other methods. For example, instead of calculating the user's weight in the home gravity system, and then converting the weight to an away gravity system, the conversion component 22 may use the pulse information generated by the pulse counter 70, and directly calculate the away gravity system weight.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A scale, comprising:
    a platform for receiving an object;
    a weighing mechanism for generating data regarding a weight of an object on the platform while the object and the scale are in a home gravity system; and
    a conversion component for converting the data into information regarding a first away weight of the user in a first away gravity system, the first away gravity system being different than the home gravity system.

2. The scale of claim 1, further comprising a display for displaying the first away weight.

3. The scale of claim 2, wherein the display comprises a digital display.

4. The scale of claim 1, wherein the conversion component is configured to convert the data into information regarding a second away weight of the object in a second gravity system.

5. The scale of claim 4, wherein the first away gravity system and the second away gravity system each comprise celestial bodies.

6. The scale of claim 5, wherein the first away gravity system and the second gravity system each consist of a celestial body in the set of the nine planets, the moon, and the sun.

7. The scale of claim 4, further comprising a display for displaying at least one of the first away weight and the second away weight.

8. The scale of claim 7, further comprising a gravity system display component for displaying a reference to a gravity system that is being displayed.

9. The scale of claim 7, further comprising a selection component for determining whether the first away weight or the second away weight is shown on the display.

10. The scale of claim 9, further comprising a gravity system display component for displaying a reference to a gravity system that is being displayed.

11. The scale of claim 9, wherein the selection component comprises a queue having multiple away weight options therein, and that displays an away weight at a beginning of the queue upon placing an object on the scale, and moves the next away weight to the end of the queue as a result of displaying the next away weight.

12. The scale of claim 11, further comprising a first display for displaying the first away weight, and a second display for displaying a weight of the object in the home gravity system.

13. The scale of claim 12, wherein the first display comprises a digital display, and the second display comprises an analog display.

14. The scale of claim 12, wherein the first display comprises a digital display, and the second display comprises a digital display.

15. The scale of claim 14, wherein the first display and the second display comprise a single digital display.

16. The scale of claim 13, wherein the weighing mechanism comprises a mechanical weighing mechanism.

17. The scale of claim 16, wherein the analog display comprises a needle and a dial.

18. The scale of claim 17, wherein the weighing mechanism comprises a pulse counter, and wherein the data is generated by the pulse counter.

19. The scale of claim 1, wherein the weighing mechanism comprises a mechanical weighing mechanism.

20. The scale of claim 1, wherein the first away gravity system comprises a celestial body.

21. The scale of claim 20, wherein the first away gravity system consists of a celestial body in the set of the nine planets, the moon, and the sun.

22. The scale of claim 1, further comprising a first display for displaying the first away weight, and a second display for displaying a weight of the object in the home gravity system.

23. The scale of claim 22, wherein the first display comprises a digital display, and the second display comprises an analog display.

24. The scale of claim 23, wherein the weighing mechanism comprises a mechanical weighing mechanism.

25. The scale of claim 24, wherein the analog display comprises a needle and a dial.

26. The scale of claim 25, wherein the weighing mechanism comprises a pulse counter, and wherein the data is generated by the pulse counter.

27. The scale of claim 1, wherein the conversion component is configured to multiply a weight of the object in the home gravity system times a gravity factor for the first away gravity system.

28. The scale of claim 1, wherein the scale comprises a body weight scale.

29. A scale, comprising:
    a platform for receiving an object;
    means for generating data regarding a weight of an object on the platform while the object and the scale are in a home gravity system; and
    means for displaying, responsive to the data, a first away weight of the user in a first away gravity system, the first away gravity system being different than the home gravity system.

30. The scale of claim 29, wherein the means for displaying comprises a conversion component for multiplying a weight of the object in the home gravity system times a gravity factor for the first away gravity system.

31. The scale of claim 30, wherein the means for displaying further comprises a digital display.

32. The scale of claim 29, further comprising means for displaying the weight of the object in the home gravity system.

* * * * *